United States Patent [19]

Tsai

[11] Patent Number: 5,302,689
[45] Date of Patent: Apr. 12, 1994

[54] THERMOTROPIC COPOLYESTER CONTAINING UNITS FROM A MIXTURE OF DICARBOXYLIC ACIDS

[75] Inventor: Hong-Bing Tsai, Hsinchu, Taiwan

[73] Assignee: Industrial Technology Research Institute, Hsinchu, Taiwan

[21] Appl. No.: 967,786

[22] Filed: Oct. 28, 1992

[51] Int. Cl.$^5$ .......................................... C08G 63/133
[52] U.S. Cl. .................... 528/194; 528/176; 528/271
[58] Field of Search ................ 528/194, 176, 271

[56] References Cited

PUBLICATIONS

Asrar et al., "Thermotropic Homopolyesters. I. The Preparation and Properties of Polymers Based on 4,4'-Dihydroxybiphenyl" Journal of Polymer Science 1119–1131, 1983.

Blumstein et al., "Synthesis and Properties of Some Polyesters with Mesogenic Groups and Flexible Spacers in the Main Chain" Polymer 23:47–52, 1982.

Tsai et al., "Further Characteriztion of the Structure and the Thermal Transistors of Poly(p-Oxybenzoate co-p-Phenylene Isophthalate) Polymers" 40:1499–1510, 1990.

Primary Examiner—Harold D. Anderson
Attorney, Agent, or Firm—Fish and Richardson

[57] ABSTRACT

A thermotropic liquid crystalline copolyester containing two different recurring units with each of the units linked to another via an ester bond, the two different recurring units having the respective formulae

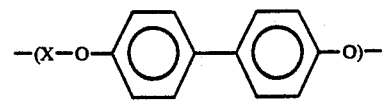

and

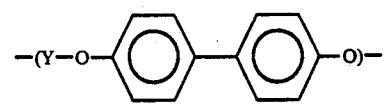

in which X is

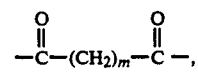

wherein m is 4–10, inclusive; and Y is

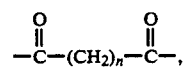

wherein n is 11–18, inclusive; and the molar ratio of X to Y in the copolyester ranging from 9:1 to 2:8.

14 Claims, No Drawings

THERMOTROPIC COPOLYESTER CONTAINING UNITS FROM A MIXTURE OF DICARBOXYLIC ACIDS

FIELD OF THE INVENTION

The invention relates to thermotropic polymers and preparation thereof.

BACKGROUND OF THE INVENTION

Thermotropic homopolyesters prepared from 4,4'-dihydroxybiphenyl and aliphatic diacids with a carbon number of 6-12 have been shown to exhibit high liquid crystallinity. See A. Blumstein, et al. Polymer 23:47 (1982); J. Asrar et al. J. Polym. Sci. Polym. Phys. Ed. 21:1119 (1983).

While these homopolyesters demonstrate an obvious liquid crystalline phase, they are too brittle to be used as high quality thermoplastics. The brittleness is attributable to high crystallinity. Thus, it is desirable to reduce the crystallinity of such polymers and thereby enhance their toughness.

SUMMARY OF THE INVENTION

In general, one aspect of the present invention features a thermotropic liquid crystalline copolyester consisting essentially of two different recurring units, with each of the units linked to another via an ester bond. The two different recurring units, respectively, have the following formulae

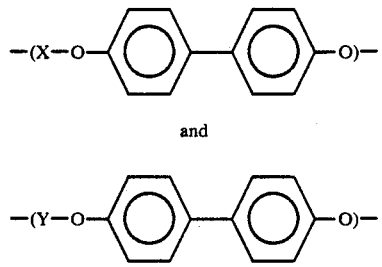

and in which X is

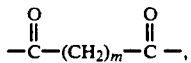

wherein m is 4-10, or, preferably, 5-9, inclusive (e.g., 6 or 8); and Y is

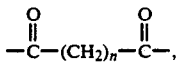

wherein n is 11-18, or, preferably, 14-18, inclusive (e.g., 18). Furthermore, the molar ratio of X to Y in the copolyester ranges from 2:8 to 9:1, preferably from 4:6 to 8:2.

For the purpose of this disclosure, each $(CH_2)_m$ and $(CH_2)_n$ represents an aliphatic group of a straight chain or branched chains. It is preferred that each X and Y contain a straight aliphatic chain.

Another aspect of the invention is a melt polycondensation method for preparing a liquid crystalline polymer in a chamber. The method includes the step of reacting 4,4'-biphenylene dialkanoate, an aliphatic diacid with a carbon number of 6-12, and another aliphatic diacid with a carbon number of 13-20 at a temperature of 200° C.-290° C., preferably 220° C.-270° C.

The above method may include, after the reacting step, an additional step of applying to the chamber a vacuum of 0.1 mmHg-5.0 mmhg, preferably 0.2 mmHg-2.0 mmHg.

Examples of 4,4'-biphenylene dialkanoates which can be used in the method include, but are not limited to, 4,4'-biphenylene diacetate, 4,4'-biphenylene dipropanoate, 4,4'-biphenylene dipropionate, 4,4'-biphenylene dibutyrate, 4,4'-biphenylene diisobutyrate, 4,4'-biphenylene divalerate, 4,4'-biphenylene diisovalerate, and 4,4'-biphenylene dicaproate. It is most preferred that 4,4'-biphenylene diacetate be used.

It is also within the scope of the present invention a liquid crystalline polymer produced by the above-described method.

Other features and advantages of the invention will be apparent from the following detailed description, and from the claims.

DESCRIPTION OF THE PREFERRED EMBODIMENTS

Structure

This invention relates to thermotropic liquid crystalline copolyesters each containing recurring alkanedioate groups of two different carbon chain lengths and recurring 4,4'-biphenylene groups. For each 4,4'-biphenylene group, an alkanedioate group is attached to its 4 position by an ester bond and another alkanedioate group to its 4' position using the same linkage.

As will be discussed below, the copolyesters of the present invention can be derived from (1) 4,4'-dihydroxybiphenyl, (2) an aliphatic diacid with a carbon number of 6-12, and (3) another aliphatic diacid with a carbon number of 13-20. For the purpose of this disclosure, an aliphatic diacid with a carbon number of 6-12 is called a short chain aliphatic diacid, and an aliphatic diacid with a carbon number of 13-20 is called a long chain aliphatic diacid.

Suitable short chain aliphatic diacids include, but are not limited to, adipic acid, pimelic acid, suberic acid, azelaic acid, sebacic acid, 1,11-undecanedioic acid and 1,12-dodecanedioic acid.

Suitable long chain aliphatic diacids, include, but are not limited to, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nonadecanedioic acid and 1,20-eicosanedioic acid.

Synthesis

Preferably, a melt Polycondensation method is used to prepare the copolyesters of the invention. See H. B. Tsai et al. J. Appl. Plym. Sci., 40:1499 (1990), hereby incorporated by reference. Note that direct Polyesterification of 4,4'-dihydroxybiphenyl, a short chain aliphatic diacid and a long chain aliphatic diacid at high temperatures is not preferred, since it results in a low molecular weight copolyester of a poor color, such as brown or black.

According to the melt polycondensation method, 4,4'-dihydroxybiphenyl is first reacted with an anhydride (e.g., acetic anhydride) to form 4,4'-biphenylene dialkanoate (e.g., 4,4'-biphenylene diacetate). Thereafter, 4,4'-biphenylene dialkanoate is melt polycondensed with a short chain aliphatic diacid and a long chain aliphatic diacid at high temperatures. At the final polymerization stage, vacuum should be applied to evacuate the by-product, alkanoic acid.

In order that the by-product can be evacuated out at the vacuum stage, the carbon number of the alkanoate group of the 4,4'-biphenylene dialkanoate should not be too high. Thus, preferred 4,4'-biphenylene dialkanoates include, but are not limited to, 4,4'-biphenylene diacetate, 4,4'-biphenylene dipropionate, 4,4'-biphenylene dibutyrate, 4,4'biphenylene diisobutyrate, 4,4'-biphenylene divalerate, 4,4'-biphenylene diisovalerate, and 4,4'-biphenylene dicaproate. 4,4'-biphenylene diacetate is particularly preferred.

In the melt polycondensation, the reaction can proceed without any catalyst. However, use of a transesterification catalyst, such as tetrabutyl orthotitanate, to increase the reaction rate may be desirable.

Without further elaboration, it is believed that one skilled in the art can, using the preceding description, utilize the present invention to its fullest extent. The following specific embodiments are, therefore, to be construed as merely illustrative, and not limitative of the remainder of the disclosure in any way whatsoever.

EXAMPLE 1

Into a 1 liter three-neck reaction kettle equipped with a mechanical stirrer, a nitrogen inlet tube and a distillation head connected to a condenser, the following reactants were added:
(a) 0.5 mole (135.0 g) of 4,4'-biphenylene diacetate (b) 0.25 mole (50.5 g) of sebacic acid, and (c) 0.25 mole (85.5 g) of 1,20-eicosanedioic acid.

The reactants were heated to 240° C. under nitrogen at a stirring speed of 200 rpm. The by-product, acetic acid, was distilled out. After about 2 hr, most acetic acid was removed. The reaction mixture was then heated to 260° C.-270° C. and vacuum was applied slowly to about 0.5 mmHg. The vacuum stage was held for about 1.5 hr.

EXAMPLES 2-9

In Examples 2-9, various copolyesters of 4,4'-dihydroxybiphenyl, sebacic acid and 1,20-eicosanedioic acid were prepared by the same procedure as described in Example 1, except that different reactant compositions were used. See Table 1.

EXAMPLE 10

A copolyester of 4,4'-dihydroxy-biphenyl, suberic acid and 1,20-eicosanedioic acid was prepared following the same procedure set out in Example 1 above, except that 0.25 mole of suberic acid was used instead of 0.25 mole of sebacic acid.

Furthermore, two homopolymers, which are not within the scope of the present invention, were also prepared. See Table 2.

Homopolymer 1, a homopolyester of 4,4'-dihydroxybiphenyl and sebacic acid, was prepared following the same procedure described in Example 1 with two exceptions. That is, 0.5 mole of sebacic acid was used instead of 0.25 mole of sebacic acid and 0.25 mole of 1,20-eicosanedioic acid, and the reaction temperature at the vacuum stage was held at 280° C.-290° C. instead of 160° C.-270° C.

Homopolymer 2, a homopolyester of 4,4'-dihydroxybiphenyl and 1,20-eicosanedioic acid, was also prepared following the same procedure described in Example 1, except that 0.5 mole of 1,20-eicosanedioic acid was used instead of 0.25 mole of sebacic acid and 0.25 mole of 1,20-eicosanedioic acid.

TABLE 2
COMPOSITION, INTRINSIC VISCOSITY, THERMAL TRANSITIONS, AND IMPACT STRENGTH OF HOMOPOLYESTERS*

| Homo-polyester | IV (dL/g) | $T_m$ (°C.) | $\Delta H_m$ (cal/g) | $T_i$ (°C.) | $\Delta H_i$ (cal/g) | Impact Strength (kg · cm/cm) |
|---|---|---|---|---|---|---|
| 1† | 0.61 | 212 | 9.6 | 283 | 13.2 | 0.6 |
| 2§ | 0.39 | 172 | 11.2 | 195 | 9.6 | 0.8 |

*The abbreviations in Table 1 (footnotes a–e) are used.
†Derived from 4,4'-dihydroxybiphenyl and sebacic acid.
§Derived from 4,4'-dihydroxybiphenyl and eicosanedioic acid.

Properties the intrinsic viscosity in phenol/tetrachloroethane (60/40 wt/wt) of each of the copolyesters and homopolyesters thus obtained was determined at 30° C. by an ubbelohde viscometer. The liquid crystalline properties were also investigated by a differential scanning carometer ("DSC") in combination with a polarized microscope. Moreover, each of the polymers was heated to a temperature above $T_i$ (isotropization temperature, i.e., liquid crystalline-isotropic transition temperature) and compression molded to a sheet. The resultant sheet

TABLE 1
COMPOSITION, INTRINSIC VISCOSITY, THERMAL TRANSITIONS, AND IMPACT STRENGTH OF COPOLYESTERS

| Example | Composition | $IV^a$ (dL/g) | $T_m^b$ (°C.) | $\Delta H_m^c$ (cal/g) | $T_i^d$ (°C.) | $\Delta H_i^e$ (cal/g) | Impact Strength (kg · cm/cm) |
|---|---|---|---|---|---|---|---|
| 1 | 1:0.5:0.5$^f$ | 0.70 | 100 | 1.5 | 206 | 11.4 | 11.0 |
| 2 | 1:0.9:0.1$^f$ | 0.89 | 172 | 4.6 | 264 | 10.4 | 1.8 |
| 3 | 1:0.8:0.2$^f$ | 0.72 | 140 | 1.9 | 250 | 12.2 | 8.1 |
| 4 | 1:0.7:0.3$^f$ | 0.80 | 110 | 1.6 | 230 | 11.3 | 7.5 |
| 5 | 1:0.6:0.4$^f$ | 0.77 | 94 | 1.0 | 220 | 11.5 | 10.0 |
| 6 | 1:0.4:0.6$^f$ | 0.54 | 112 | 2.7 | 203 | 12.1 | 8.2 |
| 7 | 1:0.3:0.7$^f$ | 0.26 | 129 | 3.1 | 202 | 12.9 | 3.1 |
| 8 | 1:0.2:0.8$^f$ | 0.14 | 152 | 6.3 | 197 | 12.1 | 1.2 |
| 9 | 1:0.1:0.9$^f$ | 0.37 | 170 | 9.1 | 195 | 11.0 | 0.6 |
| 10 | 1:0.5:0.5$^g$ | 0.58 | 102 | 1.4 | 212 | 12.1 | 7.4 |

$^a$intrinsic viscosity
$^b$melting point, or crystalline-liquid crystalline transition temperature
$^c$heat of fusion
$^d$isotropization temperature, or liquid crystalline-isotropic transition temperature
$^e$heat of isotropization
$^f$molar ratio of 4,4'-dihydroxybiphenyl:sebacic acid:eicosanedioic acid
$^g$molar ratio of 4,4'-dihydroxybiphenyl:suberic acid:eicosanedioic acid samples were cut into test specimens and their impact strength were measured according to ASTM D-256. See 1990 Annual Book of ASTM Standards Section 8 of Plastics, Volume 08.01, Pages 57-73—Standard Test Methods for Impact Resistance of Plastics and Electrical Insulating Materials, hereby incorporated by reference.

The composition, intrinsic viscosity, thermal transitions and impact strength of each of the polymers prepared according to the procedures of Examples 1-10, are shown in Table 1. Those of the two homopolymers are shown in Table 2.

Take Example 1 copolyester for example. It had an instrinsic viscosity of 0.70 dL/g. Its DSC heating curve at a heating rate of 20° C./min showed a small endothern at 100° C. and a large endothern at 206° C. Between 100° C. and 206° C., it showed melt birefringence as observed on a cross-polarized microscope. Thus, the polymer had a $T_m$ (melting point, i.e., crystalline-liquid crystalline transition temperature) of 100° C. with a heat of fusion of 1.5 cal/g and a $T_i$ of 206° C. with a heat of isotropization of 11.4 cal/g. Furthermore, it was very tough with an impact strength of 11 kg.cm/cm.

Also see Table 1 for the composition, intrinsic viscosity, thermal transitions and impact strength of each of the copolyesters of Examples 2-9, which were different in various degrees from Example 1 polymer.

As shown in Table 2, Homopolyester 1 had a $T_m$ of 212° C. with a heat of fusion of 9.6 cal/g and a $T_i$ of 283° C. with a heat of isotropization of 13.2 cal/g. The homopolymer was very brittle and had an impact strength of 0.6 kg.cm/cm.

Table 2 also shows that, Homopolyester 2 had a $T_m$ of 172° C. with a heat of fusion of 11.2 cal/g and a $T_i$ of 195° C. with a heat of isotropization of 9.6 cal/g. The polymer was also very brittle and had an impact strength of 0.8 kg.cm/cm.

Comparison of the copolyesters with the homopolyesters reveals that the former polymers, with the exception of Example 9, have much greater toughness. In particular, the copolyesters with a 1,20-eicosanedioic acid content of 20-60 mole % (based on the diacid monomers) show excellent toughness.

As an example, Homopolymer 1, a homopolyester of 4,4'-dihydroxybiphenyl and sebacic acid, possesses a heat of fusion or $\Delta H_m$ (i.e., crystalline-liquid crystalline transition heat) of about 9.6 cal/g, and exhibits a very low impact strength of about 0.6 kg.cm/cm. See Table 2. In contrast, a copolyester of 4,4'-dihydroxybiphenyl, sebacic acid and 1,20-eicosanedioic acid (molar ratio=1:0.5:0.5) possesses a heat of fusion of about 1.5 cal/g, and exhibits a high impact strength of about 11.0 kg.cm/cm. See Example 1, Table 1.

Furthermore, copolymerization has shown an interesting effect on the liquid crystalline properties. As demonstrated by a series of copolyesters of 4,4'-dihydroxybiphenyl, sebacic acid and 1,20-eicosanedioic acid (i.e., Examples 1-9), copolymerization greatly reduces the melting point, $T_m$, and the heat of fusion, $\Delta H_m$. However, it affects the isotropization temperature, $T_i$, and the heat of isotropization, $\Delta H_i$, in a different way. The $T_i$ values of the copolyesters are between those of the Homopolyesters 1 and 2, and the trend somewhat follows the rule of mixture. The $\Delta H_i$ values of the copolyesters are between 10-13 cal/g, and are not affected by the composition greatly. In other words, copolymerization does not considerably affect the liquid crystalline order.

The greater toughness exhibited by the liquid crystalline copolyesters is believed to be due to two factors; namely, copolymerization greatly reduces the crystallinity and the long chain alkanedioate groups provide more flexibility to the copolymer Thus, in the present invention, a long chain alkanedioate is incorporated into the originally brittle polyesters by copolymerization, and thermotropic liquid crystalline copolyesters which exhibit good toughness are obtained. The presence of the long chain alkanedioate reduces the crystallinity significantly, and renders flexibility thereby enhancing the toughness. The copolyesters of this invention have a wide variety of utility. To take two examples, they can be used as materials for electronic parts (e.g., connectors) and for automotive parts (e.g., housing).

From the foregoing description, one skilled in the art can easily ascertain the essential characteristics of this invention, and without departing from the spirit and scope thereof, can make various changes and modifications of the invention to adapt it to various usages and conditions. Thus, other embodiments are also within the claims set forth below.

Contemplated equivalents of the copolyesters of the invention are copolyesters otherwise corresponding thereto and having the same general properties. For example, 4,4'-dihydroxybiphenyl from which the above-described copolyesters are derived can be replaced by 4-hydroxy-N-benzylidene-4'-hydroxyaniline, 4,4'-bis(2-hydroxyethoxy)biphenyl, or 3,3'-dimethyl-4,4'-di(2-hydroxyethoxy)-stilbene. Such replacements and others are within the ability of a person of ordinary skill in the art.

What is claimed is:

1. A thermotropic liquid crystalline copolyester consisting essentially of two different recurring units with each of the units being linked to another via an ester bond, said two different recurring units having the respective formulae

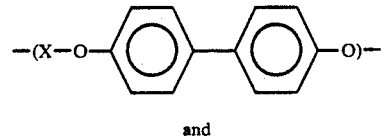

and

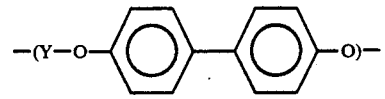

which X is

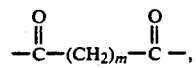

wherein m is 4-10, inclusive; and Y is

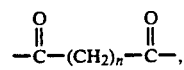

wherein n is 14-18, inclusive; and the molar ratio of X to Y in said copolyester ranging from 2:8 to 9:1.

2. The copolyester of claim 1, wherein the molar ratio of X to Y ranges from 4:6 to 8:2.

3. The copolyester of claim 1, wherein each X and Y contains a straight aliphatic chain.

4. The copolyester of claim 2, wherein each X and Y contains a straight aliphatic chain.

5. The copolyester of claim 1, wherein m is 5-9, inclusive, and n is 18, inclusive.

6. The copolyester of claim 2, wherein m is 5-9, inclusive, and n is 18, inclusive.

7. The copolyester of claim 5, wherein m is 6 or 8 and n is 18.

8. The copolyester of claim 6, wherein m is 6 or 8 and n is 18.

9. The copolyester of claim 3, wherein m is 6 or 8 and n is 18.

10. The copolyester of claim 4, wherein m is 6 or 8 and n is 18.

11. The copolyester of claim 1, wherein n is 18.

12. The copolyester of claim 2, wherein n is 18.

13. The copolyester of claim 3, wherein n is 18.

14. The copolyester of claim 4, wherein n is 18.

* * * * *